Oct. 23, 1962 R. H. BRISTOW 3,060,040
FORSTERITE-SPINEL CERAMIC BODIES
Filed Aug. 4, 1959 3 Sheets-Sheet 3

M-117 MAGNIFIED 1500 TIMES

INVENTOR:
ROBERT H. BRISTOW,
BY
HIS ATTORNEY.

United States Patent Office 3,060,040
Patented Oct. 23, 1962

3,060,040
FORSTERITE-SPINEL CERAMIC BODIES
Robert H. Bristow, Ballston Lake, N.Y., assignor to General Electric Company, a corporation of New York
Filed Aug. 4, 1959, Ser. No. 831,510
5 Claims. (Cl. 106—46)

My invention relates to ceramic bodies having the minerals spinel and forsterite both as predominant constituents and, more particularly, to such ceramic bodies which closely match the thermal expansion of titanium and materials having similar thermal expansion characteristics, have broad firing ranges, improved physical properties and are particularly adapted for employment in the manufacture of electric discharge devices using known sealing techniques.

The metal titanium has been found useful for portions of the envelope structure of evacuated electric discharge devices and, in this application, it is desirable to seal the titanium members to rigid ceramic shapes which have substantially the same total expansion at the brazing temperatures employed and which comprise wall sections of the envelope. Ideally, the expansion curves for both the titanium and the ceramic to which it is to be sealed would be linear and would be substantially identical at all temperatures up to the brazing temperature.

In U.S. Patent No. 2,912,340, issued November 10, 1959, on copending application Serial No. 546,215, filed November 10, 1955, in the name of A. G. Pincus and assigned to the same assignee as the present invention, now U.S. Patent No. 2,912,340, there is disclosed and claimed a ceramic body having the mineral forsterite as the predominant constituent and adapted for substantially matching the thermal expansion of commercial titanium at the brazing temperature. However, for some applications certain improvements are desirable. For example, greater mechanical strength and more exact or linear thermal expansion match with titanium is desirable especially in the design of large diameter seals for critical environments. Additionally, greater adjustability of the thermal expansion matching over a wide range to permit compensation for various seal configurations, operating conditions and titanium alloy compositions and heat treatment is desirable. Further, in many applications less outgassing of the ceramic during sealing is desired. Still further, during the sealing process there has been encountered the formation, on prior art ceramic bodies, of electrically conductive films which are highly undesirable when such bodies are employed as insulators in electric discharge devices. To avoid such conductive films it has heretofore been necessary to vacuum fire the bodies at substantially elevated temperatures to evolve the materials responsible for formation of the conductive films before use of the bodies in making seals. In such devices, there is also believed to exist some relationship between film formation and degradation of cathode emission which is also undesirable.

Accordingly, a primary object of my invention is to provide new and improved ceramic bodies having thermal expansion characteristics more exactly matching those of commercially pure titanium metal and metals of like thermal expansion characteristics than previously available ceramic bodies.

Another object of my invention is to provide new and improved ceramic bodies of improved mechanical strength which are free from undesirable evolution of gases during processing and operation and possessing improved electrical properties.

Another object of my invention is to provide new and improved ceramic bodies which are not subject to formation thereon of undesirable conductive films during the sealing process or during subsequent operation of the device and which do not require special processing before sealing to avoid the formation of such films.

Further objects and advantages of my invention will become apparent as the following description proceeds and the features of novelty which characterize my invention will be pointed out with particularity in the claims annexed to and forming part of this specification.

In carrying out the objects of my invention I provide vitrified ceramic bodies composed of the three solid phases spinel, forsterite, and a magnesium aluminosilicate interstitial glass, and wherein the spinel and forsterite are both predominant constituents. By predetermined composition, the average of the thermal expansion and contraction characteristics of these three constituents is made to correspond substantially exactly to that of commercial titanium. Further, in a preferred form of my invention, the thermal expansion characteristic of the glass phase is modified by the addition of a controlled or predetermined small amount of barium oxide to render it more stable and substantially compatible thermal-expansion-wise with the crystalline phases forsterite and spinel. This modification serves to avoid the formation of glass-crystal cracks, thereby to preclude entrapment and subsequent release of materials from these cracks or from the communicating pores of the body during the sealing operation; which materials can effect the formation of undesirable conductive films. For uses where the formation of conductive films or special processing to avoid formation of such films are unobjectionable, the compositions of the ceramic bodies lie preferably near the forsterite-spinel Alkemade line in the spinel primary area of the MgO—Al$_2$O$_3$—SiO$_2$ system. Where, however, it is desirable to avoid the conductive films and to preclude the need for special processing to prevent conductive film formation, the interstitial glass phase is modified and stabilized by the addition of a predetermined amount of barium oxide, as mentioned above.

For a better understanding of my invention, reference may be had to the accompanying drawing in which.

Figure 1:
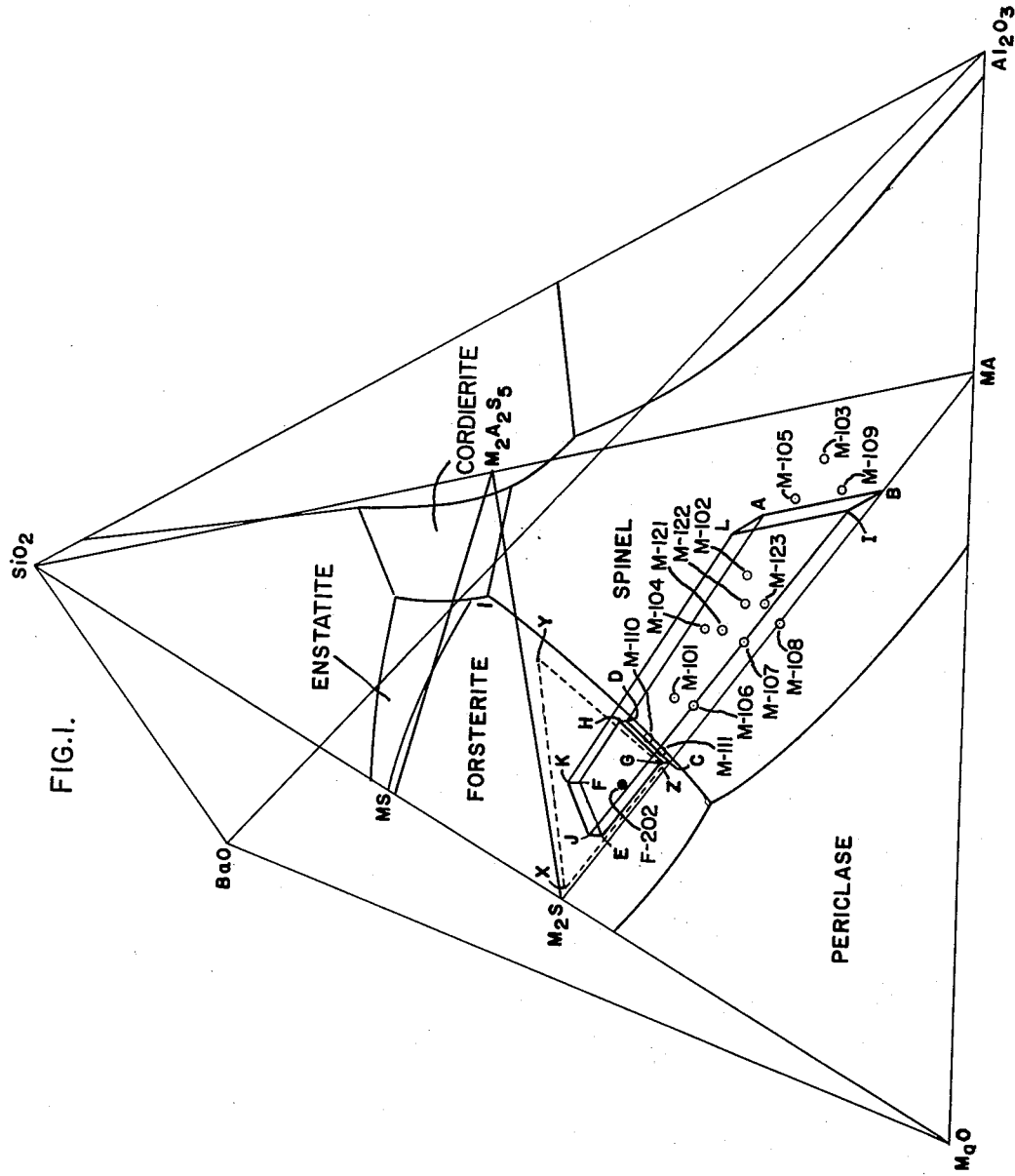
FIGURE 1 illustrates a regular tetrahedron, each apex of which represents 100 weight percent of one component thus permitting a graphical representation of all possible mixtures of four components.
Figure 2:
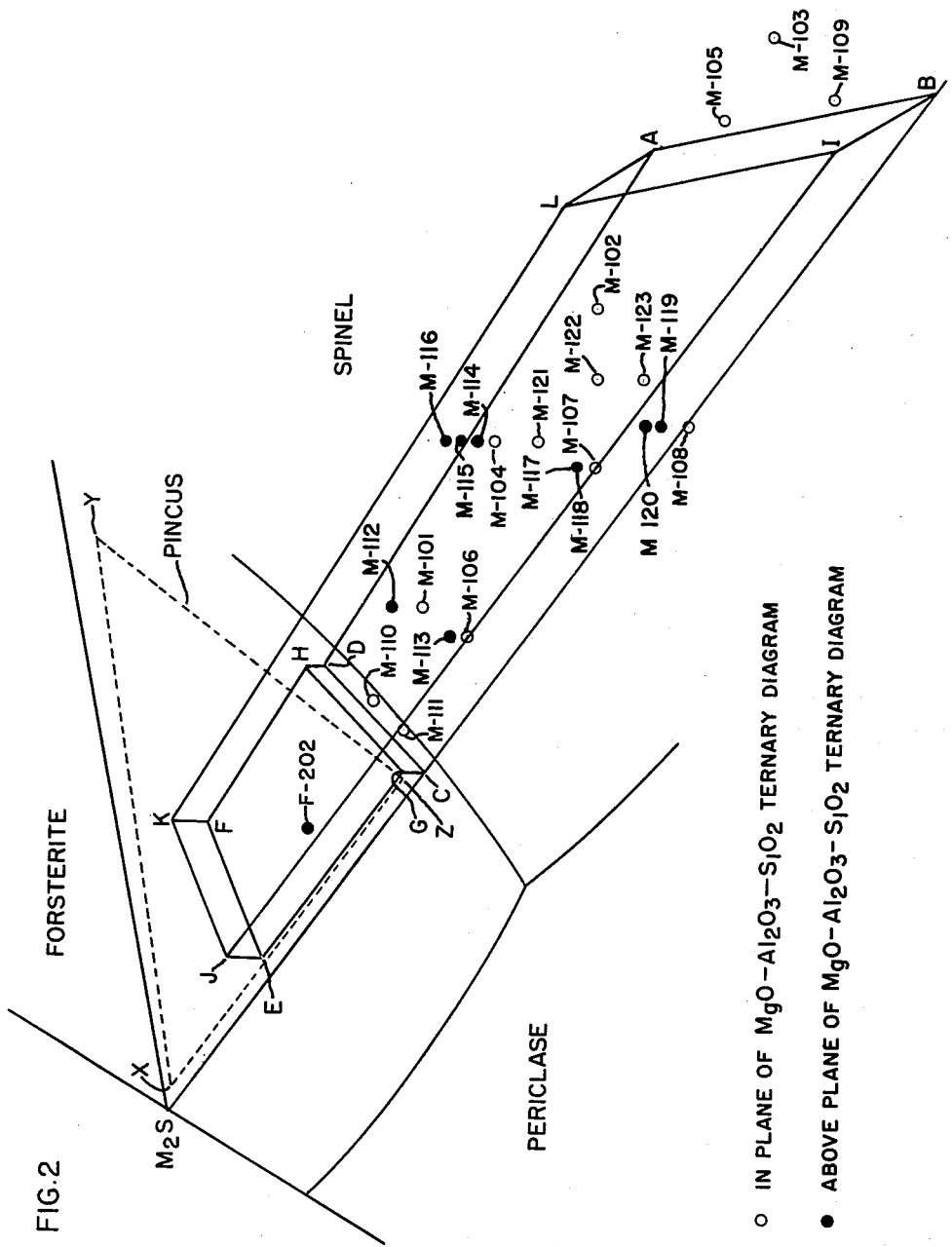
FIGURE 2 is an enlarged portion of the diagram of FIGURE 1.

In the tetrahedral diagram the bottom side, which is intended to be understood as coplanar with the surface of the drawing paper, represents the ternary

MgO—Al$_2$O$_3$—SiO$_2$ system referenced above. Each apex of this equilateral triangle represents 100 weight percent of the designated component, thus permitting a graphical representation of all possible mixtures of the three components MgO, Al$_2$O$_3$, and SiO$_2$, such representation constituting the MgO—Al$_2$O$_3$—SiO$_2$ system. By the use of straight and curved lines it is possible to sub-divide this triangle into areas or fields which represent primary phase areas, for example, the areas designated spinel, periclase and forsterite in the lower left hand portion of the diagram. Additional straight lines called Alkemade lines are used to connect the composition points of two primary phases whose areas are adjacent, for example, the Alkemade line connecting the composition points of spinel (MA) and forsterite (M₂S). In the phase diagram of a ternary system the three joins connecting the composition points of the three primary phases whose liquidus surfaces meet at a point divide the system into composition or compatibility triangles, for example, the spinel-forsterite-cordierite compatibility triangle.

The apex of BaO of the tetrahedral diagram is intended to represent a point elevated from the plane of the surface of the ternary $MgO—Al_2O_3—SiO_2$ system and comprises the top of the tetrahedron. This apex thus represents 100 weight percent BaO while the base of the tetrahedron (the plane containing the ternary $$MgO—Al_2O_3—SiO_2$$

system) represents 0 weight percent barium oxide. It is to be understood that some of the compositions employed in forming my improved ceramic bodies are devoid of intentionally added barium oxide and thus can be represented by points on that portion of the diagram which represents the ternary $MgO—Al_2O_3—SiO_2$ system while other compositions include the fourth ingredient barium oxide and will be represented by points located within the tetrahedron or, in other words, at points above the portion of the diagram representing the ternary $MgO—Al_2O_3—SiO_2$ system.

For purposes of comparison and distinction, I have illustrated on the tetrahedral diagram in the drawings the compositions of the ceramic bodies of my invention, again it being understood that some are located above the plane of the ternary $MgO—Al_2O_3—SiO_2$ diagram, and the compositions disclosed and claimed in the aforementioned Pincus application.

In addition to the highly desirable properties of vacuum tightness, low dielectric loss, and high surface and bulk resistivity, the spinel-forsterite-glass ceramic bodies of my invention substantially exactly match titanium in linear thermal expansion, said expansion being adjustable over a substantially wide range to permit compensation for various seal configurations, operating conditions and to permit matching the several grades of commercially pure titanium and titanium alloys. Additionally, the bodies of my invention possess higher mechanical strength than prior art predominantly forsterite ceramics. Furthermore, the expansion of the glass phase in my improved bodies containing BaO closely matches that of the crystalline phases forsterite and spinel, thus avoiding cracks at the crystal-to-glass bonding surfaces.

For applications where the conductive films or the special processing such as vacuum firing required to avoid the formation of such films are unobjectionable, the compositions of my bodies lie within the trapezoidal area A, B, C, D in the drawing, said points having the following weight percent oxide compositions:

| Point | MgO | Al₂O₃ | SiO₂ |
|---|---|---|---|
| A | 32.0 | 45.0 | 23.0 |
| B | 35.5 | 54.0 | 10.5 |
| C | 49.7 | 19.0 | 31.3 |
| D | 43.5 | 20.0 | 36.5 |

Compositions within the area A, B, C, D contain greater than 20 weight percent alumina, lie within the spinel primary area and yield fired ceramic bodies containing both spinel and forsterite as the predominant constituents. The linear thermal expansion of the bodies in this area is the average of the thermal expansion of the spinel, forsterite, and glass present in the bodies. However, the glass content (liquid at the maturing temperature) of bodies in this area is only sufficient to permit maturation at a commercially feasible temperature. Impurities that may be found in the commercially available materials used are not relied upon to obtain the liquid phase and, as will be seen hereinafter, it is preferable to use ingredients of chemically pure (C.P.) medicinal (N.F.) or technical (Tech.) quality in order to minimize the the introduction of impurities. In fact, the impurities, if any, present in any ceramic bodies are preferably substantially less in total than 1%.

In fired bodies which are compounded and processed in accordance with my invention the low coefficient of thermal expansion of spinel which is $8.4 \times 10^{-6}$ centimeter per centimeter per ° C. is effectively utilized to dilute the relatively higher coefficient of expansion of forsterite which is $11.5 \times 10^{-6}$ per ° C., thus to provide ceramic bodies having an expansion characteristic intermediate these two values. The glass phase, which is liquid at the maturing temperature of the body, is utilized only to assure vitrification and vacuum tightness and is not in such a quantity as would be relied upon to dilute appreciably the coefficient of expansion of the other solid phases.

Illustrated in a triangular area designated XYZ and generally outlined by dash lines are the compositions comprising the invention claimed in the aforesaid Pincus application. In accordance with the teaching of Pincus, his ceramic bodies are all in the forsterite primary area with forsterite being the only predominant constituent. This results from the employment by Pincus of relatively small proportions of Al₂O₃ in preparing his compositions which results in location of his claimed area of compositions outside of the spinel primary area. In contrast with Pincus' teaching, the present invention involves the presence of substantial proportions of Al₂O₃ which, in the presently disclosed invention, results in substantial proportions of spinel, thus to provide the substantial dilution of the coefficient of thermal expansion of the forsterite present by the spinel to result in a ceramic body having a linear thermal expansion substantially exactly matching that of titanium.

One of the contemplated uses of the spinel-forsterite ceramics of my invention is as envelope elements of electric discharge devices. An example of such an application is illustrated schematically in FIGURE 3. As shown, this device includes members 10, 11 and 12 which are disk-like elements which can be formed of metallic titanium, zirconium, alloys of these materials or materials of like thermal expansion characteristics. Members 13 and 14 comprise ceramic bodies made according to my invention and are generally tubular. The member 10 carries an active anode surface 15, the member 11 is centrally apertured and carries a mesh grid element 16, and the member 12 is formed with an emissive surface which can be rendered effective by a heater 18.

The several elements 10–14 are assembled and brazed or otherwise sealed to complete an enclosed envelope adapted for being evacuated or gas filled. Appropriate electrical connections can be made to the various electrodes through the members 10, 11 and 12.

Figure 3:
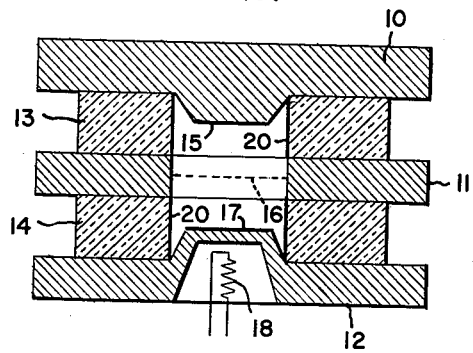
FIGURE 3 is a somewhat schematic sectional view of an electric discharge device of a type in the construction of which my improved ceramic insulator is particularly applicable.

Ceramic bodies obtained in accordance with the present teaching may, in some sealing processes used to complete an envelope of the type shown in FIGURE 3, be subject to the formation of the above-referenced undesirable conductive films which are shown exaggeratedly for purposes of illustration and are designated 20 in FIGURE 3. The reasons for the formation of the films 20 is not fully understood but is believed to result from the evolution of gases or contaminants from minute cracks between the glass and crystalline phases or from pores which communicate with the surface through these grain boundary cracks. A vitreous polyphase ceramic of the type disclosed contains many closed pores which are formed when the interstices between particles are sealed off from the surface by the liquid phase which forms during the maturation firing. The closed-pore size and content which results is a complex function of the chemical and mineralogical composition of the raw materials, the green bulk density of the formed piece and the time-temperature treatment which constitutes the maturation fire. The entrapped gases primarily constitute the decomposition products of the raw materials and the organic binders used in manufacturing the bodies such as methyl cellulose, polyethylene glycols, polyvinyl alcohols, waxes, etc. Although the glass phases of such polyphase ceramics may contain dissolved gases, as do most glasses, this source is believed to be of minor importance. In order to avoid the formation of conductive films, such bodies can be vacuum fired for several minutes at approximately 1200° C. before use in making seals. The vacuum firing serves to release and drive off the contaminants which, during the sealing process, could undergo decomposition by hot titanium components to yield gases capable of reducing constituent oxides of the ceramic to form the undesirable conductive films. As pointed out above, where the presence of these films is unobjectionable or where sealing processes are employed which do not promote film formation, the bodies formed of compositions in the area A, B, C, D are adapted for use without further processing before sealing. Where proposed to be used as insulators in electric discharge devices, for example, the presence of the conductive films may present electrical problems in operation of the device. To avoid such difficulty, the bodies can be vacuum fired as described above before carrying out the sealing process.

In accordance with a second aspect of my invention, I modify the thermal expansion of the glass phase in order to render it more compatible with the expansion of the crystalline phases spinel and forsterite. This has the desirable effect of avoiding the above-described glass-crystal cracks or microcracks in the fired ceramic bodies which, in turn, avoids the release of contaminants which can result in conductive film formations and thus obviates the need for vacuum firing.

The desired modification of the thermal expansion of the glass phase is accomplished by the employment of a fourth constituent in the body compositions, thus requiring the tetrahedral graph illustrated in the drawing to define graphically the resultant compositions. The fourth ingredient comprises barium oxide, or a compound which decomposes during firing to yield barium oxide, in an amount preferably between 1% and 3%, and the compositions of my bodies, including this amount of baria are located within the limits enclosed by the multi-sided volume defined by the points A through L in the drawing. In the drawing the "distance" of the maximum barium oxide plane (or the location of top of the box defined by the various points) above the base plane (or the bottom of the box) is exaggerated somewhat to facilitate illustration of the compositions included in my invention.

From the drawing it will be seen that my compositions which contain barium oxide extend outside of the area A, B, C, D and overlie partially that portion of the forsterite primary area of the MgO—Al$_2$O$_3$—SiO$_2$ system claimed by Pincus in the above-identified copending application. However, it will be seen from the drawing, and understood from the above and following discussion, that my compositions differ from those of Pincus by the purposeful addition of between about 1% and 3% barium oxide, while Pincus expressly considers barium oxide an undesirable impurity which is tolerated in amounts no greater than about 1%. In my ceramic bodies comprising compositions included within the volume of the tetrahedral graph defined by points A through L, the predetermined small quantity of barium oxide serves to modify the glass phase by rendering the thermal expansion thereof more compatible with the expansion of the crystalline phases present, thereby to avoid microcracks and their undesirable effects. In the experimental work described in the Pincus application referenced above, barium oxide in an amount of 6% was tried and Pincus apparently concluded that the presence of barium oxide resulted in undesirable effects which led him to state that barium oxide was to be considered an impurity to be tolerated only in amounts not to exceed 1% by weigh and not to be added for the purpose of affecting the thermal expansion of the glass phase. I have found that large barium oxide additions, for example 6%, to body compositions in this area result in the formation of interstitial glasses of very high barium oxide content, which glasses show instability and a tendency to devitrify (crystallize) during cooling to yield undesirable barium containing crystals and associated degradation of properties such as vacuum tightness, strength, and freedom from film formation during sealing.

In accordance with my invention, and as stated above, the barium oxide is not regarded as a tolerable impurity. Instead, it is an ingredient which is purposely added in a predetermined controlled quantity and which serves to modfiy the oxide composition of the liquid phase which is formed at the maturing temperature. Thus, the oxide composition and thermal expansion of the glass phase which results upon solidification is modified, such modification serving to render the expansion of the glass phase substantially more compatible with the thermal expansion of the crystalline spinel and forsterite in the ceramic. It will be understood from the present disclosure that the amount of barium oxide is sufficient to provide the desired modifications of the expansion characteristic of the glass phase but is not so great as to introduce undesirable effects on the stability, vacuum tightness, sealing abilities, or electrical characteristics of the body. With the thermal expansion of the glass and crystalline phases so matched, microcracks in the fired ceramic are avoided as are the undesirable conductive films found to result therefrom. It is believed that the barium oxide may also have a desirable effect on the elastic properties of the glass phase a swell as upon the adherence of the glass to the forsterite and spinel crystals, thus to assist in avoiding the mentioned microcracks.

It will be seen from the foregoing and the drawing that for modifying the properties of the glass phase in bodies whose composition points lie in the spinel primary area and when it is desired to avoid microcracks and their undesirable filming effects or to obviate the need for vacuum firing to avoid filming, it is preferable to employ between about 1% and up to about 3% barium oxide. However, as pointed out above, where filming or vacuum firing are not objectionable, the ceramic bodies can be formed of compositions devoid of barium oxide. Thus, where some filming is tolerable or vacuum firing is not objectionable, the compositions of my ceramic bodies in the spinel primary field can include less than the preferred amounts of from about 1% to about 3% barium oxide and, in fact, can include barium oxide from 0% to about 3% by weight. The resultant ceramic bodies will have the desired high spinel content for diluting the expansion characteristics of any forsterite present, thus to provide desired thermal expansion matching with titanium.

Accordingly, the points A through L defining the volume in the tetrahedral graph and which thus define the compositional limits by weight percentages of my invention when employing barium oxide as a fourth ingredient are as follows:

| Point | BaO | MgO | Al$_2$O$_3$ | SiO$_2$ |
|---|---|---|---|---|
| A |  | 32.0 | 45.0 | 23.0 |
| B |  | 35.5 | 54.0 | 10.5 |
| C |  | 49.7 | 19.0 | 31.3 |
| D |  | 43.5 | 20.0 | 36.5 |
| E | 1.0 | 53.5 | 7.9 | 37.6 |
| F | 1.0 | 46.5 | 11.9 | 40.6 |
| G | 1.0 | 49.2 | 18.8 | 31.0 |
| H | 1.0 | 43.1 | 19.8 | 36.1 |
| I | 3.0 | 34.9 | 52.4 | 9.7 |
| J | 3.0 | 52.4 | 7.7 | 36.9 |
| K | 3.0 | 45.6 | 11.6 | 39.8 |
| L | 3.0 | 31.0 | 43.7 | 22.3 |

Table I below lists the oxide compositions of the matured ceramic bodies prepared and tested by me in arriving at the above-discussed compositional limits of my invention:

TABLE I

*Body Oxide Compositions*

[Weight percent]

| Body number | MgO | Al₂O₃ | SiO₂ | BaO |
|---|---|---|---|---|
| M-101 | 44.0 | 25.0 | 31.0 | |
| 102 | 36.0 | 40.0 | 24.0 | |
| 103 | 28.0 | 55.0 | 17.0 | |
| 104 | 39.0 | 33.0 | 28.0 | |
| 105 | 32.0 | 48.0 | 20.0 | |
| 106 | 45.5 | 25.5 | 29.0 | |
| 107 | 42.0 | 34.0 | 24.0 | |
| 108 | 42.0 | 38.0 | 20.0 | |
| 109 | 33.0 | 52.0 | 15.0 | |
| 110 | 46.5 | 20.0 | 33.5 | |
| 111 | 48.2 | 19.8 | 32.0 | |
| 112 | 43.15 | 24.50 | 30.40 | 1.96 |
| 113 | 45.00 | 25.25 | 28.70 | 0.99 |
| 114 | 38.60 | 32.70 | 27.70 | 0.99 |
| 115 | 38.20 | 32.30 | 27.45 | 1.96 |
| 116 | 37.90 | 32.00 | 27.20 | 2.90 |
| 117 | 41.60 | 33.65 | 23.75 | 0.99 |
| 118 | 41.20 | 33.30 | 23.50 | 1.96 |
| 119 | 41.20 | 37.30 | 19.60 | 1.96 |
| 120 | 40.75 | 36.90 | 19.42 | 2.91 |
| 121 | 40.0 | 34.0 | 26.0 | |
| 122 | 38.5 | 27.5 | 24.0 | |
| 123 | 39.5 | 38.5 | 22.0 | |
| F-202 | 49.4 | 13.2 | 36.4 | 1.0 |

The general body preparation procedure which was used involved the preparation of certain batch compositions from high purity naturally occurring raw materials or preferably from synthetically prepared high purity oxides or compounds which decompose to form the desired oxides, for example, ultra fine silica (99.9% SiO₂), magnesium hydroxide which decomposes to yield magnesium oxide upon firing, barium carbonate, which decomposes to yield barium oxide upon firing, and aluminum oxide preferably in a high purity calcined form. A magnesium hydroxide found highly suitable is available through Merck and Company, Rahway, New Jersey, under the trade name Marinco H, and otherwise designated National Formulary (N.F.), Number 1211. This material has the following representative analysis:

TABLE II

*Magnesium Hydroxide*

[Powder N.F., Number 1211, Merck & Company, Marinco H]

| | | Specification | Typical, percent |
|---|---|---|---|
| Magnesium hydroxide | Mg(OH)₂ | 95.00% min | 96.65 |
| Ignition loss | | 30-33% | 31.10 |
| Free moisture | H₂O | 1.25% max | .81 |
| Calcium oxide | CaO | .70 max | .57 |
| Silicon dioxide | SiO₂ | .25 max | .16 |
| Chloride | Cl | .15 max | .09 |
| Sulfate | SO₃ | .60 max | .44 |
| Iron oxide | Fe₂O₃ | .03 max | .02 |
| Aluminum oxide | Al₂O₃ | .10 max | .05 |
| Manganese | Mn | .003 max | .0012 |
| Copper | Cu | .0005 max | .0001 |
| Arsenic trioxide | As₂O₃ | .0010 max | .0001 |
| Heavy metals | | .004 max | .002 |
| | | | 98.79 |

Aluminas which have been found suitable for use in my compositions are designated Alumina A-10 and Alumina A-14, both of which are available under these designations from the Aluminum Company of America, Pittsburgh, Pa. These materials have the following representative analyses:

TABLE III

| | Specification, percent | Typical, percent |
|---|---|---|
| Alumina, A-10: | | |
| Al₂O₃ | | 99.50 |
| Na₂O | ¹ 0.13 | 0.10 |
| SiO₂ | 0.12 | 0.10 |
| Fe₂O₃ | 0.05 | 0.04 |
| TiO₂ | 0.003 | 0.002 |
| H₂O (combined) | 0.50 | 0.15 |
| H₂O (free) | | 0.10 |
| Alumina, A-14: | | |
| Al₂O₃ | | 99.60 |
| Na₂O | 0.05 | 0.04 |
| SiO₂ | 0.12 | 0.10 |
| Fe₂O₃ | 0.05 | 0.04 |
| TiO₂ | 0.003 | 0.002 |
| H₂O (combined) | 0.50 | 0.15 |
| H₂O (free) | | 0.10 |

¹ Maximum.

A commercially available silica which has been found satisfactory is designated Ultra fine silica and is obtainable from the Pennsylvania Pulverizing Co., Trenton, New Jersey.

A commercially available barium carbonate which has been found satisfactory is Barium Carbonate #1406, precipitated technical grade and is obtainable from Baker and Adamson, General Chemical Division of Allied Chemical and Dye Corp., New York, N.Y.

Although naturally occurring raw materials such as clay and talc may be used in place of synthetically prepared materials, it is desirable to maintain, as low as possible, the level of impurities such as the alkali metal oxides and easily reducible materials such as TiO₂ and Fe₂O₃. This can be effectively accomplished by use, for example, of the above-identified types of synthetically prepared compounds and high purity oxides.

Table IV lists the batch compositions of the various bodies considered in connection with my experiments.

TABLE IV

*Body Batch Compositions*

[Weight Percent]

| Body number | Magnesium hydroxide | Ultra fine silica | Alumina calcined A-10 | Barium carbonate |
|---|---|---|---|---|
| M-101 | 53.2 | 25.9 | 20.9 | |
| 102 | 44.8 | 20.7 | 34.5 | |
| 103 | 35.9 | 15.1 | 48.9 | |
| 104 | 48.1 | 23.8 | 28.1 | |
| 106 | 54.7 | 24.1 | 21.2 | |
| 107 | 51.2 | 20.2 | 28.6 | |
| 108 | 51.1 | 16.9 | 32.0 | |
| 110 | 55.6 | 27.8 | 16.6 | |
| 111 | 57.4 | 26.3 | 16.3 | |
| 112 | 52.1 | 25.4 | 20.5 | 2.1 |
| 113 | 54.1 | 23.9 | 21.0 | 1.1 |
| 114 | 47.5 | 23.6 | 27.8 | 1.1 |
| 115 | 47.0 | 23.3 | 27.5 | 2.2 |
| 116 | 46.6 | 23.1 | 27.2 | 3.2 |
| 117 | 50.65 | 20.00 | 28.35 | 1.07 |
| 118 | 50.13 | 19.75 | 28.00 | 2.12 |
| 119 | 50.10 | 16.45 | 31.30 | 2.12 |
| 120 | 49.50 | 16.33 | 31.03 | 3.14 |
| 121 | 49.50 | 21.90 | 28.6 | |
| 122 | 47.85 | 20.35 | 31.80 | |
| 123 | 48.90 | 18.60 | 32.50 | |
| F-202 | 58.4 | 29.7 | ¹ 10.8 | 1.1 |

¹ A-14 alumina.

In preparing bodies from these compositions the finely pulverized constituent oxides and compounds were weighed to the nearest gram and charged into a one gallon jar mill, together with 200% of distilled water to provide an aqueous suspension. The batch constituents were further reduced in particle size by ball milling the suspension. After approximately 6 hours of milling each batch was dewatered in a vacuum filter, dried at 100° C. and micropulverized. Although satisfactory fired bodies could have been produced from the batches so processed, it was considered desirable to calcine the batches in order to promote thermochemical reaction of the batch constituents, evolve undesirable organic constituents or impurities of high vapor pressure, reduce firing shrinkage and promote maximum fired density. Thus, the micropulverized powders were loaded into zircon crucibles and calcined for 4 hours at a temperature of approximately 1150° C. The resultant calcine cakes were then crushed and pulverized and ball milled with 80% distilled water for approximately 6 hours to attain a particle size distribution which promoted maximum green and fired density. The material was then screened through a 200 mesh sieve, de-watered, dried and pulverized.

Each body batch was then prepared for pressing into the desired shape by mixing with 7% by weight of a 10% polyvinyl alcohol solution which can, for example, be Grade 51–05 of the Du Pont Chemical Company of Wilmington, Delaware. Samples were pressed for mechanical and electrical testing using double action pressing at a pressure of 10 tons per square inch. One-and-one-quarter inch diameter right cylinders approximately ½ inch high were formed and used for measurement of firing shrinkage, fired density, high pressure dye penetration, and vacuum tightness. The formed shapes were then heated to the maturing temperature in a clean, oxidizing atmosphere such as is obtainable in an electrically operated furnace equipped with silicon carbide heating elements. The rate of heating initially was relatively slow in order to minimize thermal gradients through the pieces as well as to permit gradual evolution of the temporary organic binder and moisture. Heating was continued for several hours at a temperature of approximately 1000° C. in order to assure maximum evolution of undesirable constituents. The temperature was then raised to the maturing temperature and held for a period of one hour in order to promote densification and maximum thermo-chemical reaction. The maturing temperature is defined as the temperature at which, with a 1-hour heating period, maximum fired density is obtained. For bodies of the described type, it has been found that optimum mechanical and electrical properties are attained when the ceramic material possesses the maximum possible density.

As indicated in Table V below, a plurality of pressed bodies composed of each of the batch compositions listed in Table IV were fired as previously described for a 1-hour duration at the various temperatures also indicated in Table V. After firing, the bodies were cooled and inspected for porosity, cracks and surface defects such as blisters or pimples. Apparent fired densities were calculated by the well-known water displacement method. The degree of vitrification was determined by the high pressure dye penetration test of the American Society of Testing Materials which is designated D–116.

TABLE V
*Firing Behavior and Fired Properties*

| Body No. | Firing temp. (° C.)(1 hr. duration) | Firing shrinkage percent Diameter | Firing shrinkage percent Length | Fired density (g./cm.³) | Porosity [1] |
|---|---|---|---|---|---|
| M-101 | 1,350 | 15.0 | 15.8 | 3.041 | V. |
|  | 1,375 | 15.4 | 16.2 | 3.081 | V. |
|  | 1,400 | 15.9 | 16.4 | 3.088 | V. |
|  | 1,425 | 15.9 | 16.1 | 3.081 | V. |
|  | 1,450 | 15.7 | 16.2 | 3.075 | V. |
| M-102 | 1,350 | 11.7 | 11.5 | | P. |
|  | 1,375 | 15.8 | 15.7 | 3.087 | V. |
|  | 1,400 | 16.5 | 16.5 | 3.093 | V. |
|  | 1,425 | 16.5 | 16.0 | 3.078 | V. |
|  | 1,450 | 16.3 | 15.9 | 3.068 | V. |
| M-103 | 1,350 | 14.6 | | | P. |
|  | 1,375 | 16.8 | 16.0 | 3.075 | P. |
|  | 1,400 | 17.2 | 16.4 | 3.110 | P. |
|  | 1,425 | 17.6 | 16.9 | 3.102 | P. |
|  | 1,450 | 17.4 | 16.9 | 3.098 | P. |
| M-104 | 1,350 | 15.8 | 16.6 | 2.991 | V. |
|  | 1,375 | 16.9 | 17.5 | 3.054 | V. |
|  | 1,400 | 16.4 | 16.6 | 3.048 | V. |
|  | 1,425 | 16.5 | 16.5 | 3.029 | V. |
|  | 1,450 | 16.5 | 16.6 | 3.015 | V. |
| M-106 | 1,350 | 17.4 | 18.4 | 3.153 | V. |
|  | 1,375 | 17.6 | 18.7 | 3.164 | V. |
|  | 1,400 | 17.6 | 18.6 | 3.155 | V. |
|  | 1,425 | 17.4 | 18.4 | 3.156 | V. |
|  | 1,450 | 17.5 | 18.5 | 3.154 | V. |

TABLE V—Continued

| Body No. | Firing temp. (° C.)(1 hr. duration) | Firing shrinkage percent Diameter | Firing shrinkage percent Length | Fired density (g./cm.³) | Porosity [1] |
|---|---|---|---|---|---|
| M-107 | 1,350 | 13.5 | 13.6 | 3.072 | P. |
|  | 1,375 | 14.8 | 14.9 | 3.140 | V. |
|  | 1,400 | 15.3 | 15.2 | 3.172 | V. |
|  | 1,425 | 15.5 | 15.4 | 3.184 | V. |
|  | 1,450 | 15.3 | 15.2 | 3.184 | V. |
|  | 1,475 | 15.7 | 15.4 | 3.178 | V. |
| M-108 | 1,365 | | | 3.161 | P. |
|  | 1,400 | | | 3.168 | P. |
|  | 1,425 | | | 3.190 | P. |
|  | 1,450 | | | 3.230 | P. |
|  | 1,475 | | | 3.236 | P. |
| M-110 | 1,325 | 16.9 | 17.7 | 3.097 | V. |
|  | 1,350 | 16.9 | 17.6 | 3.098 | V. |
|  | 1,375 | 17.1 | 17.8 | 3.097 | V. |
|  | 1,400 | 17.0 | 17.4 | 3.094 | V. |
|  | 1,425 | 16.8 | 18.2 | 3.084 | V. |
|  | 1,450 | 16.9 | 16.8 | 3.075 | V. |
|  | 1,475 | 16.5 | 16.8 | 3.054 | V. |
| M-111 | 1,325 | 15.9 | 16.1 | 3.143 | V. |
|  | 1,350 | 15.9 | 16.4 | 3.148 | V. |
|  | 1,375 | 16.6 | 16.5 | 3.163 | V. |
|  | 1,400 | 16.1 | 16.5 | 3.162 | V. |
|  | 1,425 | 16.3 | 16.4 | 3.148 | V. |
|  | 1,450 | 16.1 | 16.5 | 3.146 | V. |
|  | 1,475 | 15.5 | 15.4 | 3.133 | V. |
| M-112 | 1,350 | 18.6 | 19.4 | 3.148 | V. |
|  | 1,375 | 18.8 | 19.6 | 3.165 | V. |
|  | 1,400 | | | 3.158 | V. |
|  | 1,425 | 18.9 | 19.2 | 3.156 | V. |
|  | 1,450 | 18.6 | 18.9 | 3.140 | V. |
| M-113 | 1,375 | 17.9 | 18.8 | 3.123 | V. |
|  | 1,400 | | | 3.162 | V. |
|  | 1,425 | 18.8 | 19.6 | 3.182 | V. |
|  | 1,450 | 18.8 | 19.5 | 3.179 | V. |
| M-114 | 1,350 | | | 3.118 | V. |
|  | 1,375 | 18.4 | 18.1 | 3.119 | V. |
|  | 1,400 | 18.2 | | 3.110 | V. |
|  | 1,425 | 18.1 | 17.6 | 3.100 | V. |
|  | 1,450 | 18.0 | 17.7 | 3.090 | V. |
| M-115 | 1,350 | | | 3.155 | V. |
|  | 1,375 | 19.4 | 19.2 | 3.159 | V. |
|  | 1,400 | 19.1 | | 3.151 | V. |
|  | 1,425 | 19.0 | 18.8 | 3.145 | V. |
|  | 1,450 | 19.0 | 18.7 | 3.129 | V. |
| M-116 | 1,350 | 19.2 | 20.7 | 3.161 | V. |
|  | 1,375 | 19.0 | 19.4 | 3.166 | V. |
|  | 1,400 | | | 3.151 | V. |
|  | 1,425 | 19.0 | 19.1 | 3.142 | V. |
|  | 1,450 | 18.9 | 19.2 | 3.126 | V. |
| M-117 | 1,365 | | | 3.130 | V. |
|  | 1,400 | | | 3.175 | V. |
|  | 1,425 | | | 3.204 | V. |
|  | 1,450 | | | 3.207 | V. |
|  | 1,475 | | | 3.200 | V. |
| M-118 | 1,365 | | | 3.149 | P. |
|  | 1,400 | | | 3.174 | V. |
|  | 1,425 | | | 3.219 | V. |
|  | 1,450 | | | 3.232 | V. |
|  | 1,475 | | | 3.232 | V. |
| M-119 | 1,365 | | | 3.056 | P. |
|  | 1,400 | | | | P. |
|  | 1,425 | | | 3.18 | P. |
|  | 1,450 | | | 3.21 | P. |
|  | 1,475 | | | 3.18 | P. |
| M-120 | 1,375 | | | 3.161 | P. |
|  | 1,400 | | | 3.161 | P. |
|  | 1,425 | | | 2.166 | P. |
|  | 1,450 | | | 3.215 | P. |
|  | 1,475 | | | 3.235 | Slightly P. |
| M-121 | 1,350 | | | 3.061 | V. |
|  | 1,375 | | | 3.120 | V. |
|  | 1,400 | | | 3.119 | V. |
|  | 1,425 | | | 3.105 | V. |
|  | 1,450 | | | 3.094 | V. |
| M-122 | 1,350 | | | 2.998 | P. |
|  | 1,375 | | | 3.123 | V. |
|  | 1,400 | | | 3.129 | V. |
|  | 1,425 | | | 3.118 | V. |
|  | 1,450 | | | 3.108 | V. |
| M-123 | 1,375 | | | 3.130 | V. |
|  | 1,400 | | | 3.165 | V. |
|  | 1,425 | | | 3.179 | V. |
|  | 1,450 | | | 3.179 | V. |
| F-202 | 1,375 | 17.8 | 16.6 | 3.106 | V. |
|  | 1,400 | 18.1 | 17.1 | 3.127 | V. |
|  | 1,425 | 17.9 | 16.7 | 3.127 | V. |
|  | 1,450 | | | 3.125 | V. |

[1] P = porous; V = vacuum tight.

The blank spaces in Table V indicate cases where certain tests or measurements such as firing shrinkage or fired density were not conducted either because of the apparent porosity of the samples involved or the fact that firing shrinkage or density of some bodies were considered readily predictable from tests of previous samples of similar compositions and, therefore, further testing did not appear necessary. All of the bodies which were found to be vitreous by means of the high pressure dye test were further tested by means of a helium mass spectrometer leak detector and found to be vacuum tight.

The optimum maturing temperatures of the various bodies are listed in Table VI. Also contained in this table is a tabulation of typical physical and electrical properties measured for many of the bodies tested and obtained by means of conventional testing techniques.

and firing in such a manner as to assure thermochemical equilibrium at the maturing temperature.

In order to permit calculation of the amount of barium oxide which must be introduced into the glass phase in order to render it more compatible with the crystalline phases and thus avoid the above discussed undesirable formation of conductive films during sealing, it is necessary to know the amount of liquid phase which is contained in

TABLE VI

*Physical Properties of Experimental Bodies*

| Body No. | Relation to other bodies | Maturing temp., °C. | Firing temp. of dielectric and expansion test samples | Maximum density (g./cm.³) | Average coeff. of expansion ×10⁶ (25°–800° C.) | Dielectric properties at 10 KMc. | | Calculated phases in equil. at rm. temp. (weight percent) | | | | Calculated liquid phase content at— | |
|---|---|---|---|---|---|---|---|---|---|---|---|---|---|
| | | | | | | K | P.F. | M₂S | MA | M₂A₂S₅ | M | 1372C weight percent | Matur. temp. |
| M-101 | | 1,400 | 1,400 | 3.088 | 10.2 | 6.5 | .00056 | 60.0 | 29.7 | 10.4 | | 14.8 | 14.9 |
| M-102 | | 1,400 | 1,400 | 3.093 | 9.5 | 6.6 | .00063 | 35.6 | 47.4 | 17.0 | | 23.8 | 24.4 |
| M-103 | | 1,410 | 1,400 | 3.110 | 8.4 | | | 11.3 | 64.9 | 23.7 | | 33.0 | 33.6 |
| M-104 | | 1,375 | 1,400 | 3.054 | 9.3 | 6.4 | .00086 | 45.6 | 38.0 | 16.4 | | 22.7 | |
| M-105 | | | | 3.164 | 10.15 | | | 23.1 | 57.3 | 19.6 | | 27.1 | |
| M-106 | | 1,385 | 1,400 | 3.184 | 10.5 | 6.7 | .00064 | 62.1 | 33.2 | 4.7 | | 8.3 | |
| M-107 | | 1,430 | 1,425 | Porous | | | | 50.3 | 45.0 | 4.8 | | 6.7 | 7.2 |
| M-108 | | | | | | | | 46.6 | 53.0 | | 0.4 | 0.0 | |
| M-109 | | | | | | | | 22.1 | 67.1 | 10.8 | | 15.5 | |
| M-110 | | 1,350 | 1,350 | 3.098 | 10.15 | | | 67.7 | 23.6 | 8.8 | | 12.2 | |
| M-111 | | 1,375 | 1,375 | 3.163 | 10.04 | | | 70.6 | 26.0 | 3.4 | | 4.9 | |
| M-112 | M-101 plus 2% BaO | 1,375 | 1,375 | 3.165 | | 6.8 | .0013 | | | | | | |
| M-113 | M-106 plus 1% BaO | 1,425 | 1,425 | 3.182 | | 6.9 | .0011 | | | | | | |
| M-114 | M-104 plus 1% BaO | 1,375 | 1,375 | 3.119 | 9.5 | | | | | | | | |
| M-115 | M-104 plus 2% BaO | 1,375 | 1,375 | 3.159 | 9.5 | 6.8 | .0016 | | | | | | |
| M-116 | M-104 plus 3% BaO | 1,375 | 1,375 | 3.166 | 9.10 | | | | | | | | |
| M-117 | M-107 plus 1% BaO | 1,450 | 1,450 | 3.207 | 9.85 | 7.0 | .0010 | | | | | | |
| M-118 | M-107 plus 1% BaO | 1,460 | 1,450 | 3.232 | 9.71 | 7.0 | .00052 | | | | | | |
| M-119 | M-108 plus 2% BaO | | 1,450 | Porous | 9.80 | | | | | | | | |
| M-120 | M-108 plus 3% BaO | | | Porous | | | | | | | | | |
| M-121 | | 1,375 | 1,375 | 3.120 | | 6.7 | .00065 | 46.7 | 41.6 | 11.7 | | 16.4 | |
| M-122 | | 1,400 | 1,400 | 3.129 | | 6.7 | .00053 | 41.6 | 46.3 | 12.1 | | 16.9 | 17.7 |
| M-123 | | 1,435 | 1,425 | 3.179 | | 6.8 | .00077 | 42.8 | 50.0 | 7.2 | | 10.9 | 11.8 |
| F-202 | | 1,400 | 1,400 | 3.127 | 10.8 | 6.4 | .00074 | 94.2 | | | | | |

It will be understood that the BaO compositions indicated in Table VI are approximate, the more precise compositions being listed in Table I. It will be understood further, as believed clear from Table VI, that the compositional percentages of BaO indicated in Table I resulted from my addition, for example, of 1% of BaO to a three component body in which the MgO—Al₂O₃—SiO₂ oxide compositions already totalled 100%, such, for example, as the body M-107.

The average coefficient of expansion of commercially pure titanium metal is 10.2×10⁻⁶ per ° C. over the temperature range 25° C. to 800° C. For comparison there is listed in Table VI the average coefficient of thermal expansion of the various bodies tested over the same temperature range. Thermal expansion was measured by means of an automatically recording fused quartz tube dilatometer utilizing bar-shaped specimens 2″ by ³⁄₁₆″ square of the ceramic bodies. Two determinations were generally made on each sample each with a heating rate of 100° C. per hour and a peak temperature of 800° C. The dielectric constant and power factor were measured at a frequency of 10,000 megacycles per second and at room temperature. The samples employed for these tests were rectangular wafers 1″ x ½″ by approximately .125″ thickness. Also included in Table VI are the calculated phases in equilibrium at room temperature where M₂S designates forsterite comprising two moles magnesia and one mole silica, MS designates spinel comprising one mole magnesia and one mole alumina, M₂A₂S₅ designates cordierite comprising two moles magnesia, two moles alumina and five moles silica, and M designates periclase or magnesia. It will be noted that free magnesia was calculated to be present only in one of the bodies, which body was found to be undesirably porous at all firing temperatures employed, indicating the desirability of having the bodies substantially free of free magnesia. This is accomplished by preparing bodies only from compositions which lie on the spinel side of the spinel-forsterite Alkemade line the body at the maturing temperature. Solidification of the liquid phase during cooling results in the glass phase which exists at lower temperatures. The weight percent liquid phase of many of the bodies at the 1372° C. peritectic temperature, point 1, FIGURE 1, and at the maturing temperature was calculated and is shown in Table VI.

In Table VI some of the blank spaces indicate cases where recordings were not made by the tester because, for example, the body tested was apparently porous. The reasons for other blank spaces will be readily understood from the following discussion; and still other blank spaces indicate only that no test readings had been made or that, because of the complex four component system, calculations were not possible from available data. However, as will be understood from the information listed in Table VI and the following discussion, the prepared bodies whose compositions fall inside the volume defined by points A through L in the tetrahedral graph of the drawing are highly suitable for use as ceramic insulators in electric discharge devices, particularly wherein it is required to provide ceramic-to-titanium metal seals. For example, the materials which fall within the above-defined volume of the tetrahedral graph of the drawing are satisfactorily vacuum tight and are characterized by average coefficients of thermal expansion which satisfactorily match that of commercial pure titanium metal. Additionally, the maturing temperatures are within a range which is commercially feasible. Further, in ceramic bodies to be used as insulators in high frequency tubes it is desirable to maintain a low dielectric loss factor which is the product of the power factor and the dielectric constant of a given material, and in my bodies I have been able to obtain dielectric constants from 6.4 to 7.0 with power factors as desirably low as .0005.

I shall now discuss in detail my experimental work and calculations by which I obtained the information of the various tables and which enable me to conclude that the ceramic compositions which can be considered to be included in the volume defined by points A through L in the graph of the drawing are particularly adapted for the above-discussed purposes.

The first three bodies which were prepared and which are designated M-101, M-102, and M-103 in the various tables were used to explore compositions within the forsterite-spinel-cordierite compatibility triangle and in the spinel primary field of the MgO—$Al_2O_3$—$SiO_2$ systems. As seen in the drawing and in Table VI, these three bodies lie in such a position that the amount of liquid which is formed at the peritectic temperature of 1372° C. ranges from 15% to 33%, respectively. Their thermal expansions decreased from $10.2 \times 10^{-6}/°$ C. (from 25° C. to 800° C.) with increasing spinel to forsterite ratio. Body M-103 was porous at all firing temperatures despite the fact that the calculated amount of liquid formed exceeded 30% at the higher firing temperatures. The dye penetration test on this body revealed a non-uniform cracked or crazed appearance, rather than the uniform dye penetration which is characteristic of porous underfired bodies. It will be noted that body M-103 falls outside of the volume in the drawing which I believe is representative of satisfactory compositions.

Bodies M-104, M-105, M-106, M-107, M-108, M-109, M-121, M-122, M-123 were then considered to explore the same area in smaller increments of composition as well as at lower levels of glass (liquid) content. The thermal expansion and maturing temperature of the bodies of this group closely approximate that which would be predicted on the basis of the calculated spinel-to-forsterite ratios and the glass-to-crystal ratios. Although bodies M-105 and M-109 were never prepared, because of the probability of their thermal expansions being too low, they are listed in Table VI for comparison purposes. Additionally, it will be noted that bodies M-105, M-109 also fall outside of the volume in the drawing which I consider representative of my invention. Body M-108 is just outside of this volume and was found porous at all temperatures (up to the temperature 1475° C. which was the maximum temperature used) as would be predicted from consideration of the 1700° C. temperature of first liquid formation within the forsterite-spinel-periclase compatibility triangle.

Bodies M-110 and M-111 had higher forsterite-spinel ratios than those previously discussed and lie within the forsterite-cordierite-spinel compatibility triangle, but in the forsterite primary field. As would be predicted from the foregoing, these bodies possess high thermal expansions reflecting their higher forsterite contents.

Bodies M-112 through M-120, as well as body F-202, are each modifications of one of the previously discussed bodies. The modification of these bodies, as well as body F-202, involves adding a sufficient quantity of barium oxide to raise the thermal expansion of the glass phase so as to render it more compatible with the crystalline phases present in the fired ceramic. It is believed that all of the added barium oxide enters the liquid phase which forms during the maturation fire and, because of the relatively rapid rate of cooling as well as the absence, as determined by X-ray diffraction analysis, of phases other than spinel and forsterite in the fired ceramic, it is further believed that substantially all of the liquid cools to a glass. The composition of the liquid phase which is formed in the body at the maturation temperature was taken to be that of the 1372° peritectic and calculations of glass composition in the barium oxide-modified bodies are based thereon. The thermal expansion of a glass having the composition at the 1372° C. peritectic is only $5 \times 10^{-6}/°$ C. Although the amount of barium oxide needed in the ceramic was experimentally determined, the composition of the glass phase in bodies so modified was calculated in order to permit comparisons to be made between bodies having widely different glass phase contents.

The calculated compositions of the glass phase contained in the barium oxide-modified bodies are listed in Table VII.

TABLE VII

*Calculated Composition of the Glass Phase in BaO-Containing Bodies*

[Weight percent]

|       | BaO  | MgO  | $Al_2O_3$ | $SiO_2$ |
|-------|------|------|-----------|---------|
| F-202 | 9.6  | 23.2 | 20.6      | 46.6    |
| M-112 | 11.6 | 22.7 | 20.2      | 45.6    |
| M-113 | 10.6 | 23.0 | 20.3      | 46.0    |
| M-114 | 11.9 | 22.6 | 20.1      | 45.4    |
| M-115 | 21.2 | 20.2 | 18.0      | 40.6    |
| M-116 | 28.8 | 18.3 | 16.3      | 36.6    |
| M-117 | 11.9 | 22.6 | 20.0      | 45.5    |
| M-118 | 21.3 | 20.2 | 17.9      | 40.6    |

It is believed that the addition of approximately 10% to 20% barium oxide to the complex magnesium-alumino-silicate glass effects the desired result of modifying the thermal expansion of the glass phase to be more compatible with the thermal expansion characteristics of the crystalline phases.

Having established the quantity of barium oxide needed in the glass phase to obtain the desired results, it was possible to calculate the amount of barium oxide or barium oxide producing compound which must be added to the body batch. For example, body M-107 contains at the maturing temperature approximately 7.2% liquid which cools to a glass, the remainder being crystalline phases in the ratio of 49% spinel and 51% forsterite. In order to introduce 12% of barium oxide into the glass phase of this body and thus produce body M-117, only 1% of barium oxide had to be added to the body batch.

Although no accurate data are available on the thermal expansions of barium-magnesium-alumino-silicate glasses of this type, it is believed that the above-mentioned glass containing 12% barium oxide has a thermal expansion near that of spinel, i.e., about $8.4 \times 10^{-6}/°$ C. Thus, when a relatively small amount of barium oxide is added to a base body the expansion of the glass phase is believed to be increased but so, too, is the proportion of glass to crystalline phases in the fired body. The net result is a ceramic having about the same expansion as the base body not containing barium oxide. For example, base body M-104 has an expansion of $9.3 \times 10^{-6}/°$ C. while body M-114, containing 1% barium oxide has an expansion of $9.5 \times 10^{-6}/°$ C. If, however, a large addition of barium oxide is made resulting in a larger increase in the glass phase content, a slight decrease in thermal expansion of the fired ceramic may occur. Thus, when bodies M-115 and M-116 were prepared by adding, respectively, 2% and 3% barium oxide to the oxide composition of M-104, the expansion coefficients of the fired ceramics were $9.5 \times 10^{-6}/°$ C. and $9.1 \times 10^{-6}/°$ C.

The data of Table VI, when considered in light of the body oxide composition shown in Table I or plotted on the diagram of the drawing, reveal the correlations between the predicted glass phase content, maturing temperature, and thermal expansion. A correlation between glass phase content and dielectric power factor is less pronounced.

Barium oxide additions can, however, be seen to increase the power factor slightly, possibly due to the formation of the increased quantity of glass phase. One exception to this observation occurs with body M-118 containing 2% barium oxide and showing a power factor of only .00052. It was thought that the high barium oxide content (a calculated 21% in the glass phase) might have caused instability and consequent de-vitrification of the glass phase during cooling. That this was probably not the case was shown by X-ray diffraction analysis of this body, the base body M-107 and the base body plus a 1% addition of barium oxide (M-117). All three of these produced nearly identical diffraction patterns and showed only spinel and forsterite. No cordierite or barium containing crystals could be detected.

Bodies M-119 and M-120 (which were prepared by making, respectively, 2% and 3% barium oxide additions to M-108 the body which lay in the forsterite-spinel-periclase compatibility triangle) were poorly sintered and porous at all the temperatures, as was the base body. These observations confirm those which would be predicted from phase equilibria considerations and serve to emphasize the need for accurate control of body oxide compositions.

The bodies heretofore discussed, and found to possess the various mechanical and electrical characteristics desired in a ceramic adapted for use as an insulator in an electric discharge device, are believed to cover the area of the spinel primary field in which bodies are to be found which possess close expansion matches to metallic titanium and which are most adaptable to commercial manufacture. The accumulated data indicate that my predictions based on the phase diagram are closely followed and the preparation of vacuum tight bodies possessing still lower glass contents, higher strengths and lower dielectric losses are possible. For example, as the composition of the body is moved closer to the forsterite-spinel Alkemade line the ratio of crystalline phases to the glass phase is increased. In general this results in a reduction in the power factor and an increase in the maturing temperature. The main deterent to satisfactory commercial preparation of such bodies, however, is their sensitivity to slight changes in composition. For example, a slight increase in magnesia or a proportional decrease in the other constituents of a body such as M-107 would cause a relatively large change in liquid phase content while a further slight increase in magnesia could cause the body oxide composition to lie in the forsterite-spinel-periclase compatibility triangle, in which case, no liquid would be formed until the undesirably high temperature of 1700° C. was attained. Thus, it is concluded that the bodies which will afford all of the desired characteristics and properties and which are readily adaptable to commercial manufacture are those which lie within the volume defined by the points A through L in the drawing.

As pointed out above, increased mechanical strength is another property of my bodies which are located in the spinel primary field and are composed predominantly of both spinel and forsterite as distinguished from prior art bodies which are located in the forsterite primary area and are said to contain predominantly forsterite only. To demonstrate this, the body M-117 which was concluded to possess the best combination of properties of the bodies prepared (i.e., a thermal expansion slightly lower than that of titanium, a satisfactorily low dielectric loss factor, a commercially feasible firing temperature and firing range, and freedom from film formation during sealing) was tested for mechanical strength in flexure. Body F-202 was also found highly satisfactory as regards the desired properties sought.

Body M-117 yielded a flexural strength of 23,620 p.s.i. as compared with 20,000 p.s.i. which has been measured for prior art bodies which were predominantly forsterite only and prepared and tested in a similar manner. Additionally, it is believed possible to further increase the strength of my bodies by careful control of milled body particle size and particle size distribution, the grain size of the fired body and the rate of cooling from the maturing temperature.

Figure 4:
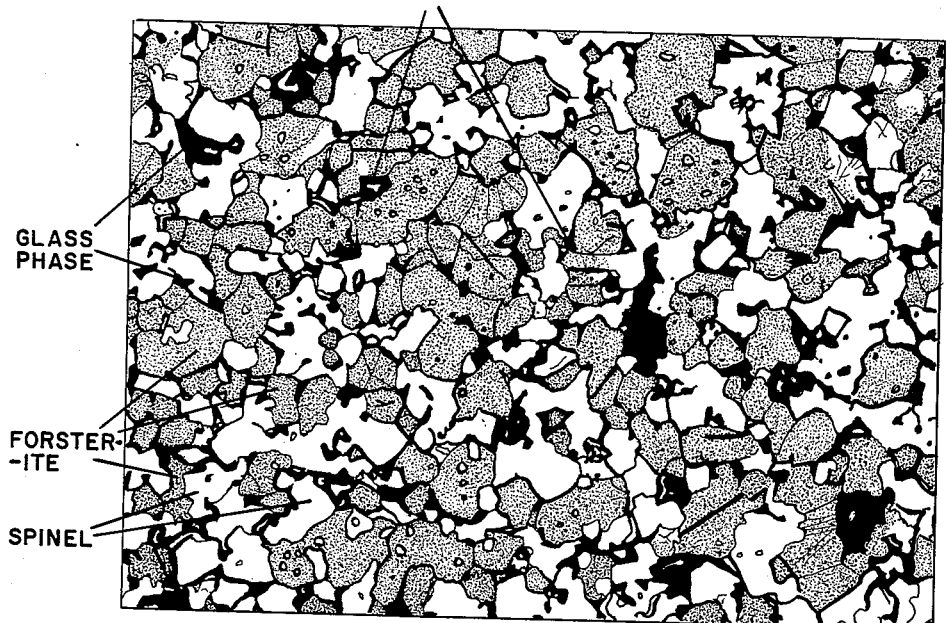
FIGURE 4 is a photomicrograph of a section of a ceramic body embodying a form of my invention and illustrating the structural features of the body which serve to afford the advantages attainable with such body.

The photomicrograph designated FIGURE 4 is a 1500 times magnification of a section of an M-117 ceramic body and the illustrated structure is considered typical of those obtained when the described compositions of my invention are fired as disclosed. As shown, the fired ceramic contains spinel crystals (light colored areas), forsterite crystals (grey colored areas), glassphase (dark grey material between grains) and a relatively small number of isolated sealed pores (large irregularly shaped black areas).

It will be understood with the aid of FIGURE 4 that the substantial spinel and forsterite crystalline structure of the ceramic body enhances the mechanical strength thereof. The proportions of the relatively high amounts of spinel and forsterite and the lesser amount of glass provides the above-discussed desired thermal expansion characteristics while the glass phase, by virtue of the modification thereof described above, avoids the formation of cracks which would afford communication between the pores and the surface of the ceramic and thus would enable the formation of undesirable films on the ceramic surface.

The preparation of evacuated titanium-ceramic sealed envelopes permitted evaluation of the film-forming tendency of the bodies, their adaptability to the titanium-nickel and titanium-cooper sealing techniques commonly employed in the art and their vacuum tightness. After sealing but prior to testing the envelopes for vacuum tightness, each insulator formed of my composition was tested for the presence of conducting films by measuring the resistance between electrodes sealed on opposite ends of such insulators with an ohmmeter. Some ceramic invariably caused readings as low as 1000 ohms while those which inhibited film formation by the inclusion of barium oxide and formed in accordance with my invention gave readings in excess of 1000 megohms. Additionally, the envelopes were tested periodically over an extended period by conventional means to determine the vacuum tightness and were found of continued high vacuum tightness.

From the foregoing, it will be seen that I have provided ceramic bodies effective for attaining all of the aforesaid desirable objects, characteristics and properties. It is to be understood, however, that while I have disclosed particular utility for these ceramic bodies in the manufacture of electric discharge devices, this use is exemplary only and my invention will be understood by those skilled in the art to have many other applications. Additionally, it is to be understood that the ceramic bodies of my invention are not limited to applications in which they are bonded to titanium members. They can be used equally effectively in other applications where, for example, only a dielectric member is required or where such a member is to be secured to metal members formed, for example, of copper, nickel or other ductile materials. Therefore, I do not desire or intend that my invention shall be limited to the particularly disclosed application and only intend to limit my invention to the subject matter of the appended claims.

What I claim as new and desire to secure by Letters Patent of the United States is:

1. A spinel-forsterite ceramic body consisting essentially of a reaction product of about 31 to 53.5 weight percent MgO, about 7.7 to 54 weight percent $Al_2O_3$, about 9.7 to 40.6 weight percent $SiO_2$ and in excess of 1 and up to about 3 weight percent BaO with substantially less than 1 weight percent of impurities, said body being vitrified to the extent that it is vacuum tight and free from continuous porosity and not to the extent that surface defects are produced, said body containing crystalline spinel, forsterite and a BaO-modified magnesium aluminosilicate glass as essential constituents, said glass having a coefficient of thermal expansion approaching those of said spinel and forsterite, and said body being substantially free of non-equilibrium phases at the maturing temperature and unreacted oxides at lower temperatures.

2. A spinel-forsterite ceramic body consisting essentially of a reaction product of about 43.1 to 53.5 weight percent MgO, about 7.9 to 19.8 weight percent $Al_2O_3$, about 31.0 to 40.6 weight percent $SiO_2$ and in excess of about 1 weight percent BaO with substantially less than 1 weight percent of impurities, said body being vitrified to the extent that it is vacuum tight and free from continuous porosity and not to the extent that surface defects are produced, said body containing crystalline spinel, forsterite and BaO-modified magnesium aluminosilicate glass as essential constituents, said glass containing between about 9.6 and 21.3 weight percent BaO and having a coefficient of thermal expansion approaching that of said spinel and forsterite and thereby effective to avoid the formation of microcracks and release of contaminants from the body upon heating, and said body being substantially free of non-equilibrium phases at the maturing temperature and unreacted oxides at lower temperatures.

3. A spinel-forsterite ceramic body consisting essentially of a reaction product of $SiO_2$, MgO, and $Al_2O_3$ having compositions lying in the quadrilateral area of the $SiO_2$—MgO—$Al_2O_3$ system bonded by straight lines connecting compositions consisting by weight percent of:

(A) 32.0 MgO, 45.0 $Al_2O_3$, and 23.0 $SiO_2$;
(B) 35.5 MgO, 54.0 $Al_2O_3$, and 10.5 $SiO_2$;
(C) 49.7 MgO, 19.0 $Al_2O_3$, and 31.3 $SiO_2$;
(D) 43.5 MgO, 20.0 $Al_2O_3$, and 36.5 $SiO_2$;

said body containing substantially less than 1 weight percent of impurities and being vitrified to the extent that it is vacuum tight and free from continuous porosity throughout the whole of said body and not to the extent that surface defects are produced; and said body containing both crystalline spinel and forsterite as the major constituents, containing magnesium aluminosilicate interstitial glass as an essential constituent, and being substantially free of non-equilibrium phases at the maturing temperature and unreacted oxides at lower temperatures.

4. A spinel-forsterite ceramic body consisting essentially of a reaction product of $SiO_2$, MgO, $Al_2O_3$, and BaO having compositions lying within the multilateral volume of the quaternary $SiO_2$—MgO—$Al_2O_3$—BaO system bounded by straight lines connecting compositions consisting by weight percent of:

(A) 32.0 MgO, 45.0 $Al_2O_3$, and 23.0 $SiO_2$;
(B) 35.5 MgO, 54.0 $Al_2O_3$, and 10.5 $SiO_2$;
(C) 49.7 MgO, 19.0 $Al_2O_3$, and 31.3 $SiO_2$;
(D) 43.5 MgO, 20.0 $Al_2O_3$, and 36.5 $SiO_2$;
(E) 1.0 BaO, 53.5 MgO, 7.9 $Al_2O_3$, 37.6 $SiO_2$;
(F) 1.0 BaO, 46.5 MgO, 11.9 $Al_2O_3$, and 40.6 $SiO_2$;
(G) 1.0 BaO, 49.2 MgO, 18.8 $Al_2O_3$, and 31.0 $SiO_2$;
(H) 1.0 BaO, 43.1 MgO, 19.8 $Al_2O_3$, and 36.1 $SiO_2$;
(I) 3.0 BaO, 34.9 MgO, 52.4 $Al_2O_3$, and 9.7 $SiO_2$;
(J) 3.0 BaO, 52.4 MgO, 7.7 $Al_2O_3$, and 36.9 $SiO_2$;
(K) 3.0 BaO, 45.6 MgO, 11.6 $Al_2O_3$, and 39.8 $SiO_2$;
(L) 3.0 BaO, 31.0 MgO, 43.7 $Al_2O_3$, and 22.3 $SiO_2$;

said body containing substantially less than 1 weight percent of impurities and being vitrified to the extent that it is vacuum tight and free from continuous porosity throughout the whole of said body and not to the extent that surface defects are produced, and said body containing both crystalline spinel and forsterite as the major constituents and magnesium aluminosilicate interstitial glass as an essential constituent, said glass being modified where BaO is provided, and said glass when modified being characterized by increased stability and a coefficient of thermal expansion more closely approaching the coefficients of thermal expansion of said spinel and forsterite and thereby effective to avoid the formation of microcracks and release of contaminants from the body upon heating, and said body being substantially free of non-equilibrium phases at the maturing temperatures and unreacted oxides at lower temperatures.

5. A spinel-forsterite ceramic body consisting essentially of a reaction product of $SiO_2$, MgO, $Al_2O_3$, and BaO having compositions lying within the multilateral volume of the quaternary $SiO_2$—MgO—$Al_2O_3$—BaO system bounded by straight lines connecting compositions consisting by weight percent of:

(1) 32.0 MgO, 45.0 $Al_2O_3$, and 23.0 $SiO_2$;
(2) 35.5 MgO, 54.0 $Al_2O_3$, and 10.5 $SiO_2$;
(3) 49.7 MgO, 19.0 $Al_2O_3$, and 31.3 $SiO_2$;
(4) 43.5 MgO, 20.0 $Al_2O_3$, and 36.5 $SiO_2$;
(5) 3.0 BaO, 42.2 MgO, 19.4 $Al_2O_3$, and 35.4 $SiO_2$;
(6) 3.0 BaO, 48.2 MgO, 18.4 $Al_2O_3$, and 30.4 $SiO_2$;
(7) 3.0 BaO, 34.9 MgO, 52.4 $Al_2O_3$, and 9.7 $SiO_2$; and
(8) 3.0 BaO, 31.0 MgO, 43.7 $Al_2O_3$, and 22.3 $SiO_4$;

said body containing substantially less than 1 weight percent of impurities and being vitrified to the extent that it is vacuum tight and free from continuous porosity throughout the whole of said body and not to the extent that surface defects are produced, said body containing both crystalline spinel and forsterite as the major constituents and magnesium aluminosilicate interstitial glass as an essential constituent, said glass being modified where said BaO is provided, and said glass when modified being characterized by increased stability and a coeffecent of thermal expansion more closely approaching the coefficients of thermal expansion of spinel and forsterite and thereby effective to avoid the formation of microcracks and release of contaminants from the body upon heating, and said body being substantially free of non-equilibrium phases at the maturing temperature and unreacted oxides at lower temperatures and having an average coefficient of thermal expansion which is substantially the average of the coefficients of expansion of said spinel, forsterite and glass.

References Cited in the file of this patent

UNITED STATES PATENTS

| | | |
|---|---|---|
| 2,227,770 | Ungewiss | Jan. 7, 1941 |
| 2,962,136 | Pincus | Nov. 29, 1960 |

OTHER REFERENCES

Phase Diagrams for Ceramists, The American Ceramic Society, Inc., 1956, pages 142–144.

UNITED STATES PATENT OFFICE
CERTIFICATE OF CORRECTION

Patent No. 3,060,040                                    October 23, 1962

Robert H. Bristow

It is hereby certified that error appears in the above numbered patent requiring correction and that the said Letters Patent should read as corrected below.

Column 1, line 31, strike out "now U.S. Patent No. 2,912,340,"; column 3, line 9, strike out "of", first occurrence; line 68, for "expansion" read -- expansions --; column 4, line 2, strike out "the", second occurrence; line 3, for "any", second occurrence, read -- my --; column 5, line 73, for "weigh" read -- weight --; columns 9 and 10, TABLE V, under the heading "Fired Density (g./cm.$^3$)", lines 21, 22, 23, 24, 25, 26, 32, and 57, strike out the commas and insert instead decimal points; columns 11 and 12, TABLE VI, under the heading "Maximum Density (g./cm.$^3$)", line 11, strike out the comma and insert instead a decimal point; column 16, line 24, for "ceramic" read -- ceramics --.

Signed and sealed this 7th day of May 1963.

(SEAL)
Attest:
ERNEST W. SWIDER
Attesting Officer

DAVID L. LADD
Commissioner of Patents